Sept. 23, 1924.
W. G. COX
1,509,395
SPRING BUMPER FOR AUTOMOBILES
Filed Aug. 14, 1922
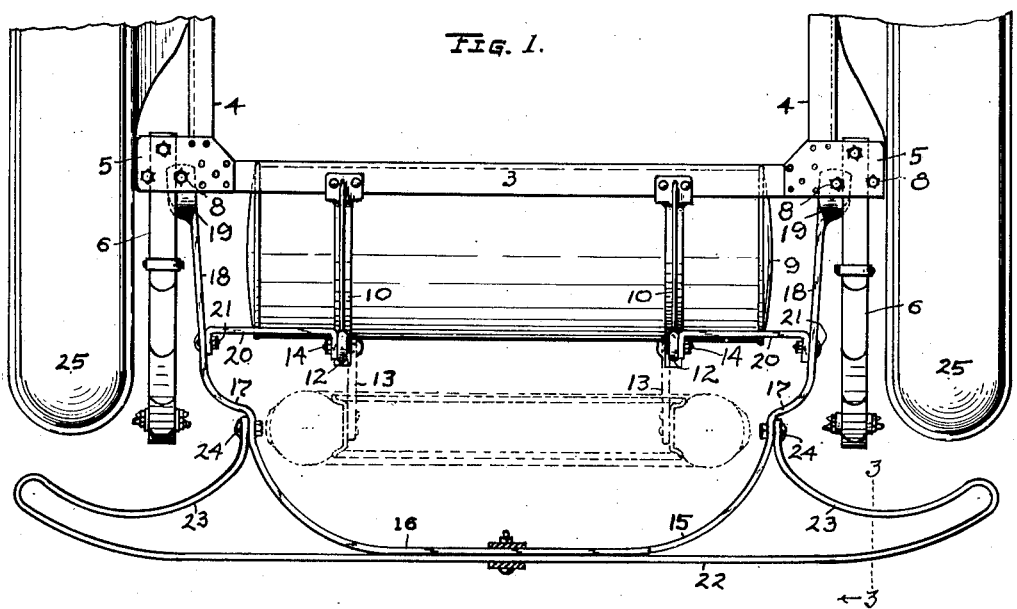
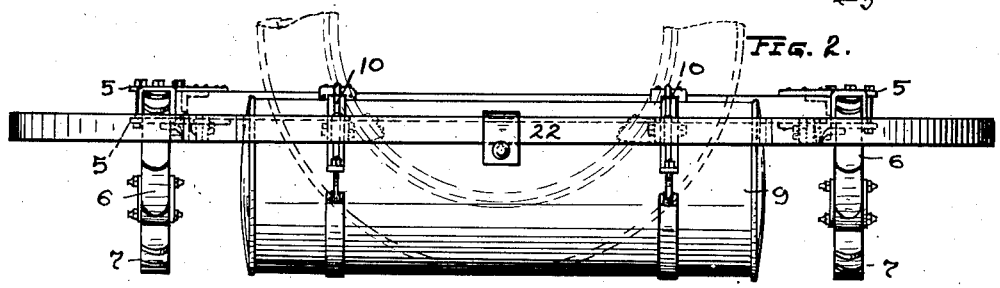
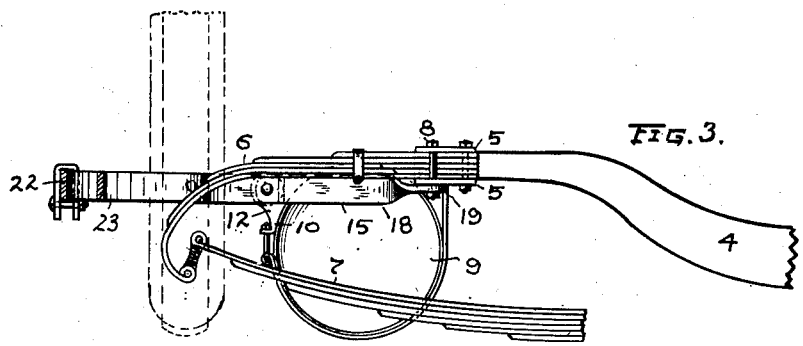
Inventor
W. G. COX.

UNITED STATES PATENT OFFICE.

WILLIAM G. COX, OF CLEVELAND, OHIO, ASSIGNOR, BY MESNE ASSIGNMENTS, TO THE EATON AXLE AND SPRING COMPANY, OF CLEVELAND, OHIO, A CORPORATION OF OHIO.

SPRING BUMPER FOR AUTOMOBILES.

Application filed August 14, 1922. Serial No. 581,755.

*To all whom it may concern:*

Be it known that I, WILLIAM G. Cox, a citizen of the United States, residing at Cleveland, in the county of Cuyahoga and State of Ohio, have invented certain new and useful Improvements in a Spring Bumper for Automobiles, of which the following is a specification.

This invention relates to an improvement in a spring bumper for automobiles, the object being to provide a bumper which is particularly constructed to facilitate its attachment to a motor car having quarter-elliptic springs and tank brackets extending rearwardly from the chassis frame of the car. Briefly, the bumper shown and described herein is adapted to be attached to the car without using any other bolts or other clamping devices than those found upon and forming a part of the car as equipped and sold to the public.

In the annexed drawing, Fig. 1 is a plan view of the chassis frame of an automobile in general use and showing my improved bumper mounted thereon. Fig. 2 is a rear elevation of the bumper as it appears mounted upon the frame as shown in Fig. 1. Fig. 3 is a side elevation of the frame and springs and gasoline tank and a vertical section of the bumper on line 3—3 of Fig. 1.

In a well known type of automobile the chassis frame comprises a cross piece 3 at its rear end which is extended to a point beyond each side piece 4 by separate upper and lower plates 5 riveted to said pieces at their meeting ends. The rear spring suspension for this frame consists of quarter-elliptic springs 6 and semi-elliptic springs 7 shackled together, and the butt ends of the quarter-elliptic springs 6 are fastened by nuts and bolts 8 between the laterally extending plates 5, see Fig. 3. A gasoline tank 9 is also supported at the rear of cross piece 3 of the chassis frame by means of a pair of curved bracket members 10 and a clamping band 11, the bracket members 10 having a rearwardly extending ear or lug 12 to which a tire carrier 13 is fastened, the tire and its carrier being shown in dotted lines in Fig. 1. Bolts and nuts 14 secure the tire carrier to the lugs 12.

I avail myself of the structure described to fasten a bumper rigidly thereon, by constructing a bumper as follows: A flat bar 15 of spring metal is bent into arched shape, the crown portion 16 of the arch being flattened and straight and a short curved bend or offset 17 being made in each side portion or leg 18 which extends straight for a substantial distance to permit these legs to be placed intermediate the ends of the gasoline tank 9 and the quarter-elliptic springs 6. The end portion 19 of each leg is twisted or bent at right angles to provide a flat horizontal extremity with a bolt opening therein adapted to receive the lower end of one of the bolts 8 which fasten the butt end of the quarter-elliptic spring between plates 5, the same nut for the bolt being used to clamp these parts together. The bumper is further supported by short flat bars 20 having short right-angled ends secured by bolts or rivets 21 to the flat inside faces of legs 18 and extending horizontally toward bracket members 10 where locking engagement and support is provided by the nut or bolt 14 which is used to secure the tire carrier in place. To that end each bar 20 is bent at right-angles at its outer end to clamp flat against the ear or lug and is provided with a bolt opening to receive bolt 14. These lateral bars 20 serve as transverse braces for the tank brackets and for the bumper, and the bumper is firmly supported in a horizontal protecting position directly opposite the tank. The offset 17 in each leg of the bumper is located opposite the shackle for the suspension springs and the purpose of the offset is to provide ample space or room at this point for oiling cups, to permit oiling or greasing of the shackles, and to permit repairs.

As shown the bumper bar has a separate impact bar 22 secured to it. This bar 22 has reversely curved ends 23 secured by bolts 24 to the legs of the bar where offset, and the straight middle portion of this impact bar extends parrallel with and in contact with the flat crown portion of main bar 15 and may be riveted or otherwise fastened to it. The loop ends of the front bar are of sufficient length to protect the fenders 25, and while these loop ends possess a certain amount of spring and flexibility they are firmly braced by their union with the main bar.

What I claim is,

1. An automobile bumper comprising an arched bar having attaching legs provided with lateral offset portions therein and perforated extremities, lateral bracing and supporting bars affixed to said legs, and an impact bar at the front side of said arched bar having looped end portions secured at their extremities to the offset portions of said arched bar.

2. A rear bumper for an automobile, comprising an arched member spanning the gasoline tank and spare-tire bracket having bent extremities secured to the spring supporting plates at the respective corners of the automobile frame, together with an impact member connected to the center of said arched member and extending laterally on opposite sides beyond the supporting springs of the vehicle.

3. A rear bumper for an automobile having a frame with corner plates for the springs, comprising an inside member of arched form spanning the gasoline tank and spare tire bracket, said arched member having its ends secured to the spring plates at the respective corners of the frame, separate braces placed between said member and the hangers for said tank, together with an outside impact member connected at its middle and ends to said inside member and extending laterally on opposite sides beyond the supporting springs of the vehicle.

In testimony wherof I affix my signature.

WILLIAM G. COX.